United States Patent
Kuriyama et al.

(10) Patent No.: US 8,647,530 B2
(45) Date of Patent: *Feb. 11, 2014

(54) LIQUID CRYSTAL COMPOSITION CONTAINING POLYMERIZABLE COMPOUND AND LIQUID CRYSTAL DISPLAY ELEMENT MANUFACTURED USING THE SAME

(75) Inventors: Takeshi Kuriyama, Saitama (JP); Kazuki Kurisawa, Saitama (JP); Shotaro Kawakami, Saitama (JP)

(73) Assignee: DIC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/475,213

(22) Filed: May 18, 2012

(65) Prior Publication Data
US 2012/0292568 A1 Nov. 22, 2012

(30) Foreign Application Priority Data

May 20, 2011 (JP) ................................. 2011-113457

(51) Int. Cl.
- C09K 19/06 (2006.01)
- C09K 19/52 (2006.01)
- C09K 19/30 (2006.01)
- C09K 19/12 (2006.01)
- C09K 19/00 (2006.01)
- C09K 19/02 (2006.01)
- G02F 1/1333 (2006.01)

(52) U.S. Cl.
USPC ............. 252/299.6; 252/299.01; 252/299.63; 252/299.66; 428/1.1; 349/86; 349/182

(58) Field of Classification Search
USPC ............. 252/299.01, 299.6, 299.63, 299.66; 428/1.1; 349/86, 182
See application file for complete search history.

(56) References Cited

U.S. PATENT DOCUMENTS

| | | | | |
|---|---|---|---|---|
| 2011/0186776 A1* | 8/2011 | Kuriyama et al. | ........ | 252/299.61 |
| 2011/0253933 A1* | 10/2011 | Hirata et al. | ............... | 252/299.4 |
| 2011/0253936 A1* | 10/2011 | Kurisawa et al. | ........ | 252/299.61 |

FOREIGN PATENT DOCUMENTS

| | | |
|---|---|---|
| JP | 2003-307720 A | 10/2003 |
| JP | 2004-302096 A | 10/2004 |
| JP | 2008-116931 A | 5/2008 |
| JP | 2009-102639 A | 5/2009 |
| WO | 2010/084823 A1 | 7/2010 |

* cited by examiner

*Primary Examiner* — Geraldina Visconti
(74) *Attorney, Agent, or Firm* — Westerman, Hattori, Daniels & Adrian, LLP

(57) ABSTRACT

A liquid crystal composition containing a polymerizable compound contains one or two or more polymerizable compounds having the general formula (I) as a first component and one or two or more non-polymerizable liquid crystal compounds having an alkenyl group as a second component. A liquid crystal display element is manufactured using the liquid crystal composition.

13 Claims, No Drawings

LIQUID CRYSTAL COMPOSITION CONTAINING POLYMERIZABLE COMPOUND AND LIQUID CRYSTAL DISPLAY ELEMENT MANUFACTURED USING THE SAME

BACKGROUND OF THE INVENTION

1. Field of the Invention

The present invention relates to a liquid crystal composition containing a polymerizable compound and a liquid crystal display element manufactured using the liquid crystal composition.

2. Description of the Related Art

Polymer sustained alignment (PSA) liquid crystal display elements have a polymer structure formed in cells for controlling the pretilt angle of liquid crystal molecules. Because of their high-speed responsivity and high contrast, PSA liquid crystal display elements are being developed as liquid crystal display elements.

PSA liquid crystal display elements are manufactured by injecting a polymerizable composition, which contains a liquid crystal compound and a polymerizable compound, between substrates and polymerizing the polymerizable compound to fix the orientation of liquid crystal molecules, which have been oriented through the application of a voltage. A display defect "burn-in" of PSA liquid crystal display elements is known to be caused by impurities and variations in the orientation of liquid crystal molecules (variations in pretilt angle).

Burn-in due to impurities is caused by a polymerizable compound remaining after incomplete polymerization and a polymerization initiator for promoting polymerization. Thus, it is necessary to minimize the amount of polymerizable compound remaining after polymerization and the amount of polymerization initiator to be added. For example, the addition of a large amount of polymerization initiator so as to complete polymerization results in a decrease in the voltage holding ratio of a display element because of a residual polymerization initiator, thus adversely affecting display quality. However, an excessive decrease in the amount of polymerization initiator so as to prevent a decrease in the voltage holding ratio results in incomplete polymerization and the presence of a residual polymerizable compound, which will cause burn-in. In order to complete the polymerization of a polymerizable compound with a minimum amount of polymerization initiator to decrease the amount of residual polymerizable compound, a large amount of energy, such as strong UV irradiation for a long period of time, may be applied. However, this requires large manufacturing equipment, results in decreased manufacturing efficiency, and causes deterioration of the liquid crystal material due to UV irradiation. It is therefore difficult for existing liquid crystal compositions containing a polymerizable compound to simultaneously decrease the amounts of residual polymerizable compound and residual polymerization initiator. Thus, there is a demand for a liquid crystal composition containing a polymerizable compound that can be completely polymerized without using a polymerization initiator.

It is also known that burn-in can result from variations in the pretilt angle of liquid crystal molecules in a liquid crystal composition containing a polymerizable compound. More specifically, when a polymer produced by the polymerization of a polymerizable compound is flexible, prolonged display of a single pattern with a display element manufactured using the polymer can change the structure of the polymer and consequently change the pretilt angle. Variations in pretilt angle can cause burn-in. Thus, the polymerizable compound should form a polymer having a rigid structure.

In order to prevent burn-in by increasing the rigidity of a polymer, Japanese Unexamined Patent Application Publication No. 2003-307720 discloses a display element manufactured using a polymerizable compound having a 1,4-phenylene group, which only has a ring structure and a polymerizable functional group, and Japanese Unexamined Patent Application Publication No. 2008-116931 discloses a display element manufactured using a polymerizable compound having a biaryl structure. However, these polymerizable compounds have low compatibility with liquid crystal compounds and may be precipitated in liquid crystal compositions.

Also in order to prevent burn-in by increasing the rigidity of a polymer, Japanese Unexamined Patent Application Publication No. 2004-302096 discloses a display element manufactured using a liquid crystal composition that contains a mixture of a bifunctional polymerizable compound and an at least trifunctional polymerizable compound, such as dipentaerythritol pentaacrylate or dipentaerythritol hexaacrylate. However, dipentaerythritol pentaacrylate and dipentaerythritol hexaacrylate, which have no ring structure, have low affinity for liquid crystal compounds and are therefore less likely to control the orientation of liquid crystal molecules, resulting in insufficient orientation stability. Furthermore, these polymerizable compounds require a polymerization initiator in polymerization and can remain after polymerization without a polymerization initiator.

In the case of PSA liquid crystal display elements for use in liquid crystal television sets, there is a strong demand for PSA liquid crystal display elements having high-speed responsivity so as to improve motion picture display performance. In order to reduce response time, Japanese Unexamined Patent Application Publication No. 2009-102639 and WO 2010/084823 disclose a liquid crystal composition containing a polymerizable compound that contains a non-polymerizable liquid crystal compound having an alkenyl group. However, these patent literatures focus solely on the non-polymerizable liquid crystal compound and do not describe a combination of the non-polymerizable liquid crystal compound and the polymerizable compound. Consequently, there are some problems, including the precipitation of the polymerizable compound.

Thus, it is difficult for these techniques to satisfy characteristics required for a liquid crystal composition containing a polymerizable compound, such as high-speed responsivity, burn-in resistance of display elements, orientation stability, stability of the composition without precipitation, and high efficiency in the manufacture of PSA liquid crystal display elements. Thus, these techniques should be further improved.

SUMMARY OF THE INVENTION

Accordingly, it is an object of the present invention to provide a liquid crystal composition containing a polymerizable compound that can provide high-speed responsivity, is not precipitated in a wide temperature range, can be polymerized at high speed, can control liquid crystal orientation after polymerization, and causes no display defect, such as burn-in. It is another object of the present invention to provide a liquid crystal display element having excellent display quality without variations in display characteristics using the liquid crystal composition containing a polymerizable compound.

As a result of extensive studies on various polymerizable compounds and various non-polymerizable liquid crystal compounds, the present inventors arrived at the present invention by finding that a liquid crystal composition that contains a polymerizable compound and a non-polymerizable liquid crystal compound each having a particular structure can achieve the objects described above.

The present invention provides a liquid crystal composition containing a polymerizable compound, which contains a first component and a second component, wherein the first component includes one or two or more compounds selected from the group consisting of polymerizable compounds having the general formula (I), and the second component includes one or two or more non-polymerizable liquid crystal compounds having an alkenyl group. The present invention also provides a liquid crystal display element manufactured using the liquid crystal composition.

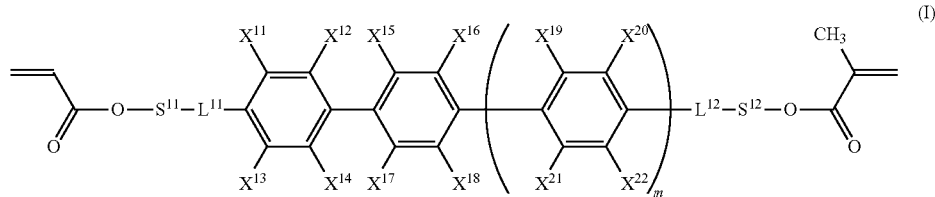

(I)

(wherein $S^{11}$ and $S^{12}$ independently denote an alkylene group having 1 to 12 carbon atoms or a single bond, and one —$CH_2$— or nonadjacent two or more —$CH_2$— in the alkylene group may be substituted by —O—, —COO—, —OCO—, or —OCOO—, $L^{11}$ and $L^{12}$ independently denote a single bond, —O—, —CO—, —COO—, —OCO—, or —C≡C—, m denotes 0 or 1, and $X^{11}$ to $X^{22}$ independently denote an alkyl group having 1 to 3 carbon atoms, a trifluoromethyl group, a trifluoromethoxy group, a fluorine atom, a chlorine atom, or a hydrogen atom.)

The polymerizable compound(s) and the non-polymerizable liquid crystal compound(s), which are essential components of the present invention, have excellent compatibility and can constitute a stable liquid crystal composition containing a polymerizable compound that can retain a nematic state even at low temperature. The non-polymerizable liquid crystal compound(s) can provide high-speed responsivity. In addition, high polymerization speed of the polymerizable compound(s) can reduce energy consumed by polymerization and significantly reduce adverse effects on the non-polymerizable liquid crystal compound(s). This can significantly reduce display defects in a liquid crystal display element to which liquid crystal orientation ability is imparted by the polymerization of the polymerizable compound(s) in the liquid crystal composition and can also improve manufacturing yield. Thus, the liquid crystal composition is useful for the liquid crystal display element.

DESCRIPTION OF THE PREFERRED EMBODIMENTS

Polymerizable Compounds

In the general formula (I), $S^{11}$ and $S^{12}$ independently denote an alkylene group having 1 to 12 carbon atoms or a single bond, and one —$CH_2$— or nonadjacent two or more —$CH_2$— in the alkylene group may be substituted by —O—, —COO—, —OCO—, or —OCOO—. Preferably, $S^{11}$ and $S^{12}$ independently denote an alkylene group having 1 to 6 carbon atoms or a single bond, and —$CH_2$— in the alkylene group may be substituted by an oxygen atom, —COO—, —OCO—, or —OCOO—, provided that oxygen atoms are not directly bonded to each other. More preferably, $S^{11}$ and $S^{12}$ independently denote an alkylene group having 1 to 4 carbon atoms or a single bond. $L^{11}$ and $L^{12}$ independently denote a single bond, —O—, —CO—, —COO—, —OCO—, or —C≡C—, preferably a single bond. m denotes 0 or 1. $X^{11}$ to $X^{22}$ independently denote an alkyl group having 1 to 3 carbon atoms, a trifluoromethyl group, a trifluoromethoxy group, a fluorine atom, a chlorine atom, or a hydrogen atom, preferably a methyl group, a trifluoromethyl group, a fluorine atom, or a hydrogen atom. More preferably, any one of $X^{11}$ to $X^{22}$ is a methyl group or a fluorine atom. Still more preferably, any one of $X^{11}$ to $X^{22}$ is a methyl group or a fluorine atom, and the others are hydrogen atoms.

Preferred examples of the skeleton of a polymerizable compound having the general formula (I) (a mesogenic portion between $L^{11}$ and $L^{12}$) include those having the general formulae (I-1) to (I-24).

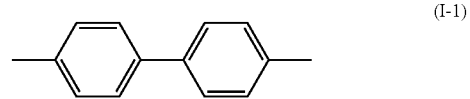

(I-1)

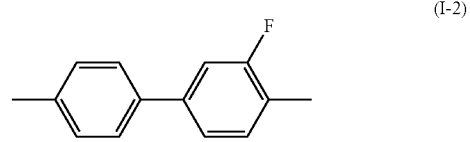

(I-2)

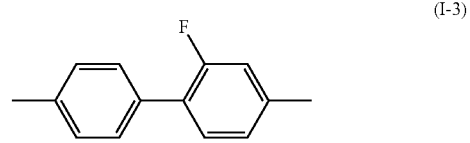

(I-3)

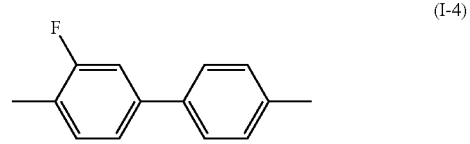

(I-4)

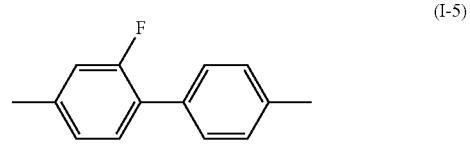

(I-5)

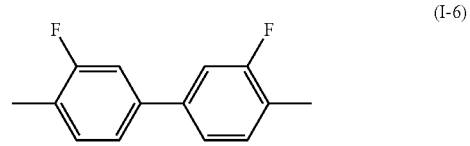

(I-6)

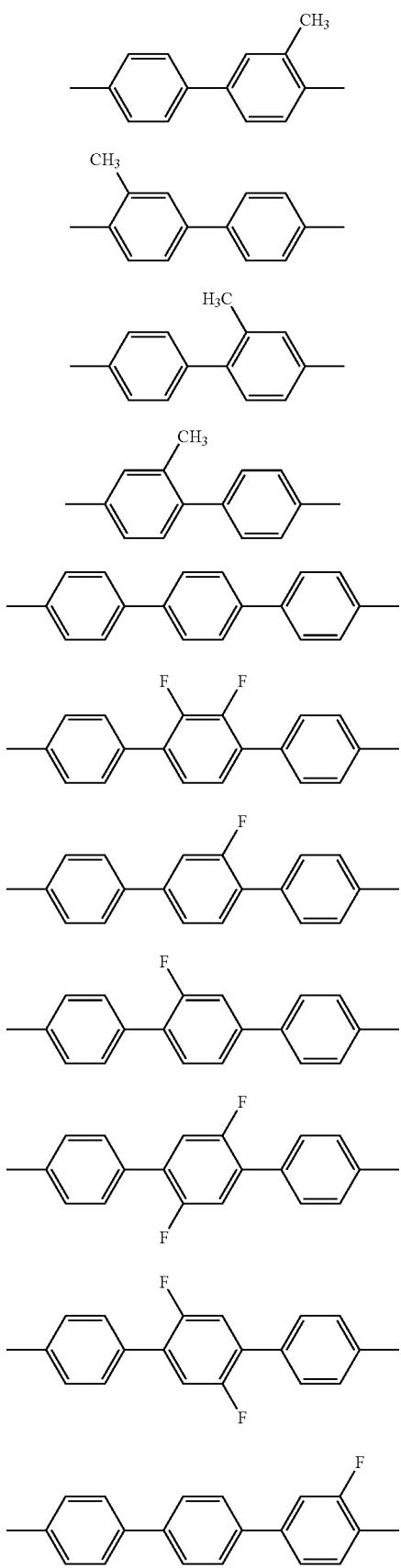
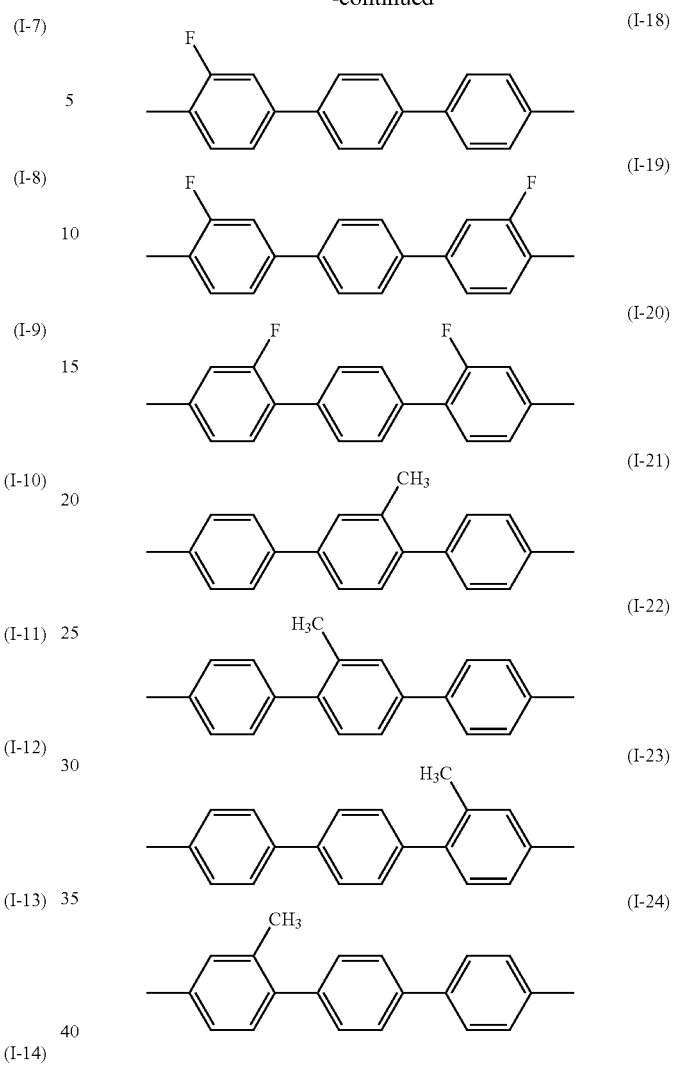

Polymerizable compounds having the skeletons having the general formulae (I-1) to (I-10) have good compatibility with non-polymerizable liquid crystal compounds and can constitute a stable liquid crystal composition that can retain a nematic state even at low temperature. Polymerizable compounds having the skeletons having the general formulae (I-11) to (I-24) can be polymerized at high speed and can appropriately control liquid crystal orientation after polymerization to achieve satisfactory liquid crystal orientation.

A liquid crystal composition containing a polymerizable compound according to the present invention contains at least one, preferably one to five, more preferably one to three, polymerizable compound having the general formula (I).

An excessively low percentage of polymerizable compound(s) having the general formula (I) is less likely to control liquid crystal orientation. On the other hand, an excessively high percentage of polymerizable compound(s) having the general formula (I) results in an increase in energy required for polymerization and an increase in the amount of residual polymerizable compound(s), causing a display defect. Thus, the polymerizable compound(s) preferably constitutes 0.01% by mass or more, more preferably 0.03% by mass or more, still more preferably 0.05% by mass or more, but preferably 2.0% by mass or less, more preferably 1.0% by mass or less, still more preferably 0.5% by mass or less, of the liquid crystal composition containing a polymerizable compound.

Liquid Crystal Compound

The non-polymerizable liquid crystal compound(s) having an alkenyl group in the second component is preferably a compound having the general formula (II).

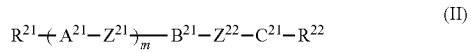

(wherein $R^{21}$ and $R^{22}$ independently denote an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, at least one of $R^{21}$ and $R^{22}$ denotes an alkenyl group having 2 to 10 carbon atoms or an alkenyloxy group having 2 to 10 carbon atoms, one —$CH_2$— or nonadjacent two or more —$CH_2$— in $R^{21}$ and $R^{22}$ may be substituted by —O— or —S—, and one or two or more hydrogen atoms in $R^{21}$ and $R^{22}$ may be substituted by a fluorine atom or a chlorine atom, $Z^{21}$ and $Z^{22}$ independently denote a single bond, —$CH_2CH_2$—, —$(CH_2)_4$—, —$OCH_2$—, —$CH_2O$—, —$OCF_2$—, —$CF_2O$—, —CH=CH—, or —C≡C—, and $A^{21}$, $B^{21}$, and $C^{21}$ independently denote a 1,4-phenylene group, a 1,4-cyclohexenylene group, a 1,4-bicyclo(2.2.2)octylene group, a naphthalene-2,6-diyl group, a decahydronaphthalene-2,6-diyl group, a 1,2,3,4-tetrahydronaphthalene-2,6-diyl group, or a 1,4-cyclohexylene group, $A^{21}$, $B^{21}$, and $C^{21}$ may be independently unsubstituted, or a hydrogen atom in $A^{21}$, $B^{21}$, and $C^{21}$ may be substituted by a fluorine atom, a chlorine atom, a cyano group, an alkyl group having 1 to 8 carbon atoms, a halogenated alkyl group having 1 to 8 carbon atoms, a halogenated alkoxy group having 1 to 8 carbon atoms, an alkoxy group having 1 to 8 carbon atoms, or a nitro group, and m denotes 0 or 1.)

Preferably, $R^{21}$ and $R^{22}$ independently denote an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, more preferably an alkyl group having 1 to 7 carbon atoms, an alkoxy group having 1 to 7 carbon atoms, an alkenyl group having 2 to 7 carbon atoms, or an alkenyloxy group having 2 to 7 carbon atoms, still more preferably an alkyl group having 1 to 5 carbon atoms, an alkoxy group having 1 to 5 carbon atoms, an alkenyl group having 2 to 5 carbon atoms, or an alkenyloxy group having 2 to 5 carbon atoms. $R^{21}$ and $R^{22}$ preferably have a straight chain. At least one of $R^{21}$ and $R^{22}$ is preferably an alkenyl group or an alkenyloxy group.

Preferably, $Z^{21}$ and $Z^{22}$ independently denote a single bond, —$CH_2CH_2$—, —$OCH_2$—, —$CH_2O$—, —$OCF_2$—, —$CF_2O$—, —CH=CH—, or —C≡C—, more preferably a single bond, —$CH_2CH_2$—, —$OCH_2$—, or —$CH_2O$—.

Preferably, $A^{21}$, $B^{21}$, and $C^{21}$ independently denote a 1,4-phenylene group, a 1,4-bicyclo(2.2.2)octylene group, a naphthalene-2,6-diyl group, a decahydronaphthalene-2,6-diyl group, a 1,2,3,4-tetrahydronaphthalene-2,6-diyl group, or a 1,4-cyclohexylene group, more preferably a 1,4-phenylene group, a naphthalene-2,6-diyl group, or a 1,4-cyclohexylene group, still more preferably a 1,4-phenylene group or a 1,4-cyclohexylene group. Preferably, $A^{21}$, $B^{21}$, and $C^{21}$ are independently unsubstituted, or a hydrogen atom in $A^{21}$, $B^{21}$, and $C^{21}$ is substituted by a fluorine atom, a chlorine atom, a cyano group, an alkyl group having 1 to 8 carbon atoms, a halogenated alkyl group having 1 to 8 carbon atoms, a halogenated alkoxy group having 1 to 8 carbon atoms, or an alkoxy group having 1 to 8 carbon atoms. More preferably, $A^{21}$, $B^{21}$, and $C^{21}$ are independently unsubstituted, or the hydrogen atoms in $A^{21}$, $B^{21}$, and $C^{21}$ are independently unsubstituted, or a hydrogen atom in $A^{21}$, $B^{21}$, and $C^{21}$ is substituted by a fluorine atom, an alkyl group having 1 to 3 carbon atoms, a halogenated alkyl group having 1 to 3 carbon atoms, a halogenated alkoxy group having 1 to 3 carbon atoms, or an alkoxy group having 1 to 3 carbon atoms.

m denotes 0 or 1.

More specifically, the compound having the general formula (II) is preferably selected from the compounds having the general formulae (II-1) to (II-4) and the compounds having the general formulae (II-5) to (II-10).

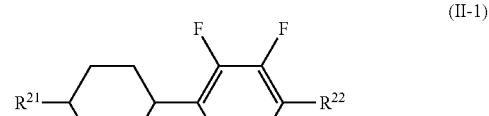

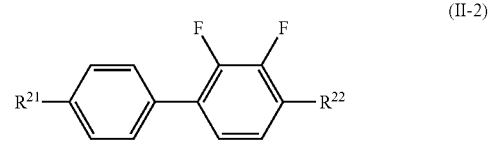

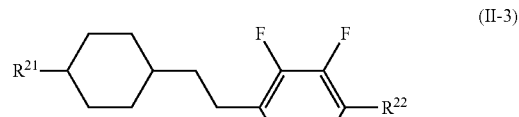

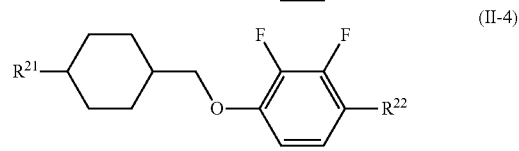

(wherein $R^{21}$ and $R^{22}$ are described above.)

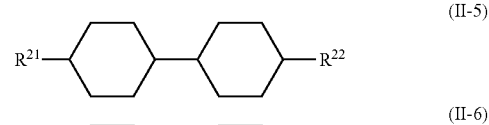

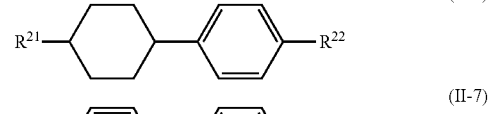

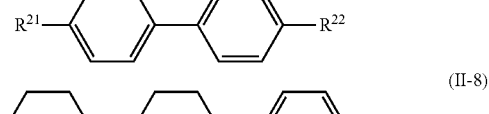

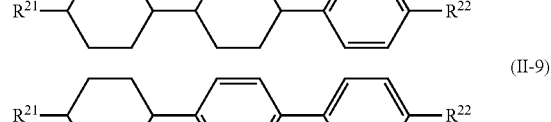

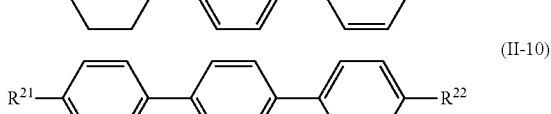

(wherein $R^{21}$ and $R^{22}$ are described above.)

A liquid crystal composition containing a polymerizable compound according to the present invention contains one or two or more, preferably one to six, more preferably one to five, compounds having the general formula (II). The compound having the general formula (II) preferably constitutes 5% by mass or more, more preferably 8% by mass or more, still more preferably 10% by mass or more, but preferably 40% by mass or less, more preferably 35% by mass or less, still more preferably 25% by mass or less, of the liquid crystal composition containing a polymerizable compound.

A liquid crystal composition containing a polymerizable compound according to the present invention may further contain a non-polymerizable liquid crystal compound having no alkenyl group.

More specifically, the non-polymerizable liquid crystal compound having no alkenyl group may have one of the general formulae (III-1) to (III-44).

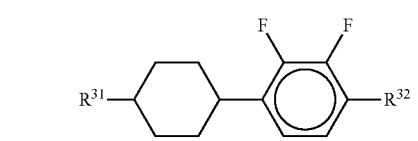
(III-1)

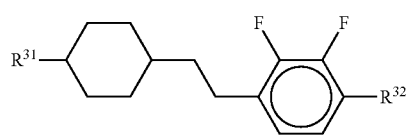
(III-2)

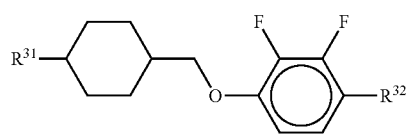
(III-3)

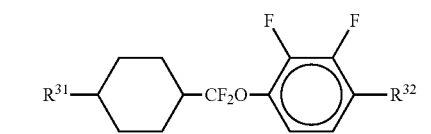
(III-4)

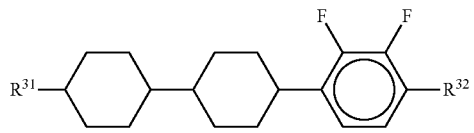
(III-5)

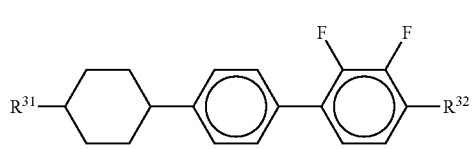
(III-6)

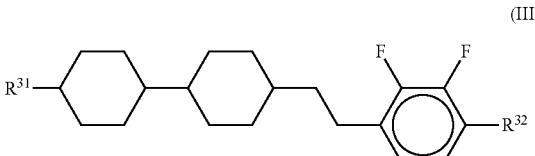
(III-7)

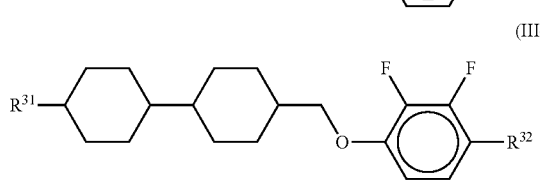
(III-8)

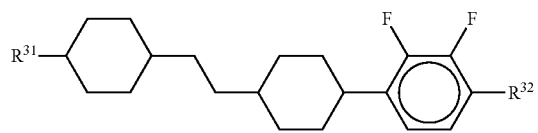
(III-9)

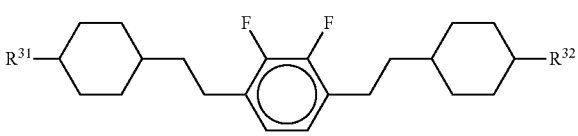
(III-10)

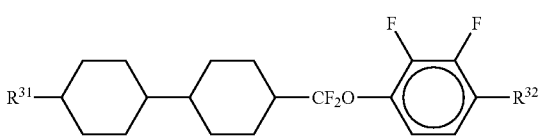
(III-11)

(III-12)

(III-13)

(III-14)

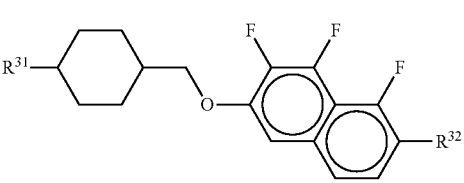
(III-15)

(III-16)

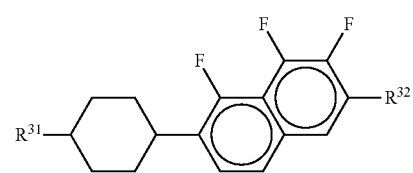
(III-17)

(III-18) 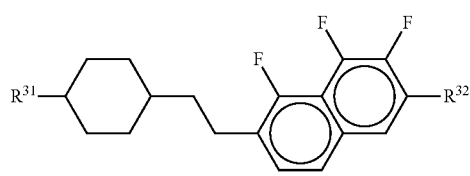
(III-19) 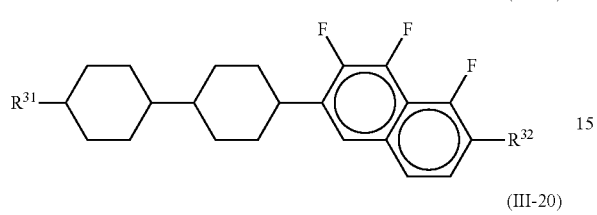
(III-20) 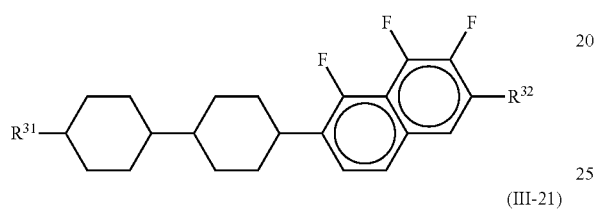
(III-21) 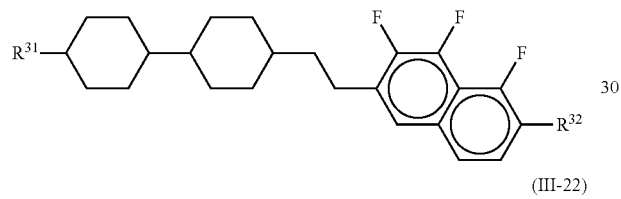
(III-22) 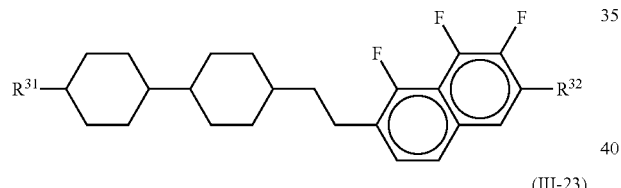
(III-23) 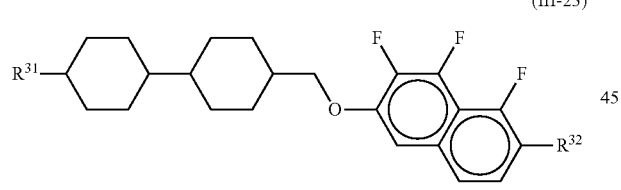
(III-24) 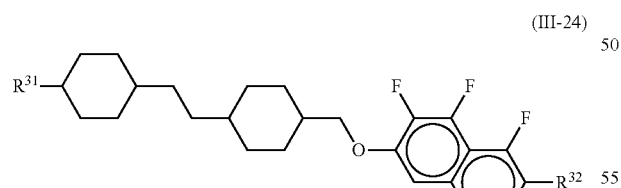
(III-25) 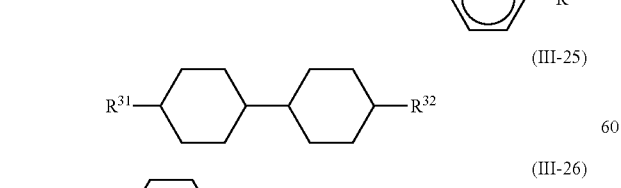
(III-26) 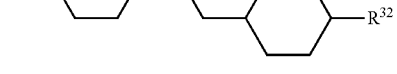
(III-27) 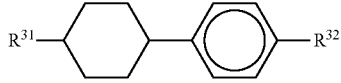
(III-28) 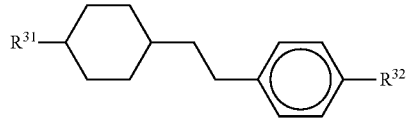
(III-29) 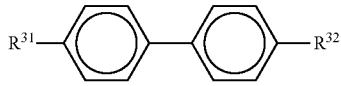
(III-30) 
(III-31) 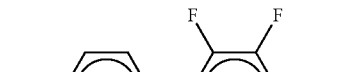
(III-32) 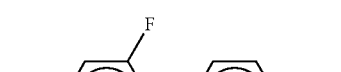
(III-33) 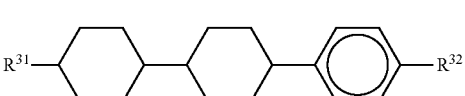
(III-34) 
(III-35) 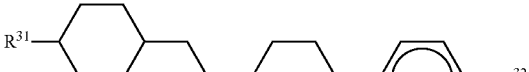
(III-36) 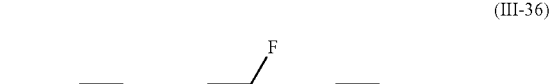
(III-37) 

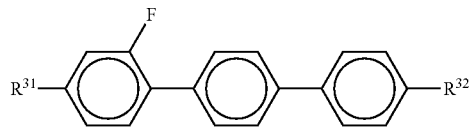
(III-38)

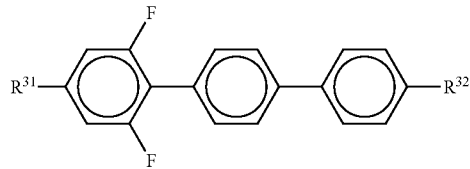
(III-39)

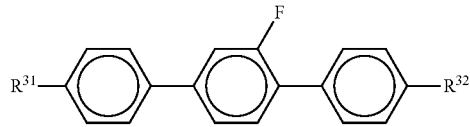
(III-40)

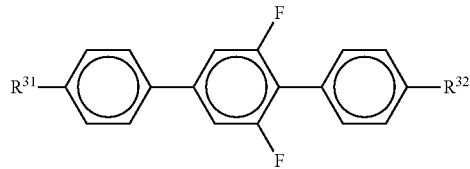
(III-41)

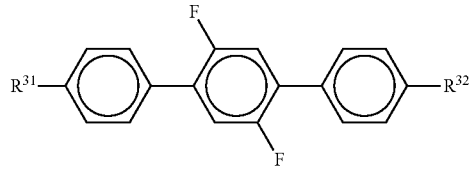
(III-42)

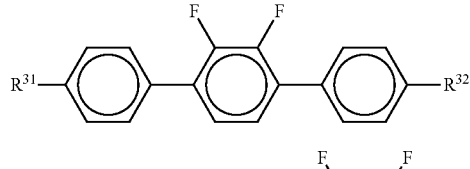
(III-43)

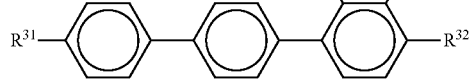
(III-44)

(wherein $R^{31}$ and $R^{32}$ independently denote an alkyl group having 1 to 10 carbon atoms or an alkoxy group having 1 to 10 carbon atoms, one —CH$_2$— or nonadjacent two or more —CH$_2$— in $R^{31}$ and $R^{32}$ may be substituted by —O— or —S—, and one or two or more hydrogen atoms in $R^{31}$ and $R^{32}$ may be substituted by a fluorine atom or a chlorine atom.)

Liquid Crystal Composition and Liquid Crystal Display Element

A liquid crystal composition according to the present invention preferably has a nematic phase-isotropic liquid phase transition temperature ($T_{ni}$) in the range of 60° C. to 120° C., more preferably 65° C. or more, still more preferably 70° C. or more, but more preferably 100° C. or less, still more preferably 90° C. or less.

A liquid crystal composition according to the present invention preferably has an anisotropy of dielectric constant (Δε) in the range of −2.0 to −6.0, more preferably −2.5 to −5.0, still more preferably −2.5 to −3.5, at 25° C.

A liquid crystal composition according to the present invention preferably has an anisotropy of reflective index (Δn) in the range of 0.08 to 0.13, more preferably 0.09 to 0.12, at 25° C. More specifically, the anisotropy of reflective index (Δn) is preferably in the range of 0.10 to 0.12 for a small cell gap and 0.08 to 0.10 for a large cell gap.

A liquid crystal composition according to the present invention preferably has a viscosity (η) in the range of 10 to 30 mPa·s, more preferably 10 to 25 mPa·s, still more preferably 10 to 20 mPa·s, at 20° C.

In addition to the compounds described above, a liquid crystal composition according to the present invention may contain a common nematic liquid crystal material, smectic liquid crystal material, cholesteric liquid crystal material, antioxidant, UV absorber, polymerization initiator, or polymerization inhibitor.

Although the polymerizable compound(s) in a liquid crystal composition containing a polymerizable compound according to the present invention can be polymerized in the absence of a polymerization initiator, the liquid crystal composition may contain a polymerization initiator so as to promote polymerization. Examples of the polymerization initiator include benzoin ethers, benzophenones, acetophenones, benzyl ketals, and acylphosphine oxides.

A liquid crystal composition according to the present invention may contain a stabilizer so as to improve storage stability. Examples of the stabilizer include hydroquinones, hydroquinone monoalkyl ethers, tert-butylcatechols, pyrogallols, thiophenols, nitro compounds, β-naphthylamines, β-naphthols, and nitroso compounds. The amount of stabilizer is preferably in the range of 0.005% to 1% by mass, more preferably 0.02% to 0.5% by mass, still more preferably 0.03% to 0.1% by mass, of the liquid crystal composition.

In a liquid crystal composition according to the present invention, polymerizable compound(s) in the liquid crystal composition is polymerized to impart liquid crystal orientation ability to the liquid crystal composition. A liquid crystal composition according to the present invention can be used in liquid crystal display elements that can control the amount of transmitted light utilizing birefringence of the liquid crystal composition. A liquid crystal composition according to the present invention can be used in active-matrix liquid crystal display (AM-LCD) elements, twisted nematic (TN) liquid crystal display elements, supertwisted nematic liquid crystal display (STN-LCD) elements, optically compensated birefringence liquid crystal display (OCB-LCD) elements, and in-plane switching liquid crystal display (IPS-LCD) elements, particularly in AM-LCD. A liquid crystal composition according to the present invention can be used in transmissive and reflective liquid crystal display elements.

Two substrates of a liquid crystal cell in a liquid crystal display element may be made of glass or a flexible transparent material, such as a plastic. One of the two substrates may be made of an opaque material, such as silicon. A transparent substrate having a transparent electrode layer may be produced by the deposition of indium tin oxide (ITO) on a transparent substrate, such as a glass plate, by sputtering.

A color filter may be formed on a substrate by a pigment dispersion, printing, electrodeposition, or staining method. For example, a method for producing a color filter by pigment dispersion will be described below. A curable coloring composition for color filters is applied to a transparent substrate, is patterned, and is heated or irradiated to be cured. This process is performed repeatedly to produce red, green, and blue pixel units of a color filter. A pixel electrode may be formed on the substrate. The pixel electrode includes an active element, such as a thin-film transistor (TFT), a thin-film diode, a metal insulator, or a metal resistivity element.

The substrates are disposed facing each other such that a transparent electrode layer is disposed inside. The distance between the substrates may be adjusted with a spacer. Preferably, the distance between the substrates may be adjusted such that the resulting light control layer has a thickness in the range of 1 to 100 μm, more preferably 1.5 to 10 μm. In the case that a liquid crystal display element includes a polarizer, the product of the anisotropy of reflective index Δn of liquid crystals and the cell thickness d is preferably adjusted so as to maximize contrast. In the case that a liquid crystal display element includes two polarizers, the polarization axis of each of the polarizers may be adjusted so as to improve the view angle or contrast. A retardation film for increasing the view angle may also be used. Examples of the spacer include glass particles, plastic particles, alumina particles, and photoresist materials. Subsequently, a sealant, such as a thermosetting epoxy composition, is applied to the substrates by screen printing such that a liquid crystal inlet is formed. The substrates are then joined and heated to cure the sealant.

A liquid crystal composition containing a polymerizable compound may be applied between two substrates by vacuum injection or one drop fill (ODF).

In order to achieve high liquid crystal orientation ability, an appropriate polymerization speed is desirable. Thus, the polymerizable compound(s) is preferably polymerized by irradiation of an active energy beam, such as UV light or an electron beam, alone, in combination, or in sequence. In the case of UV light, a polarized or unpolarized light source may be used. When the polymerizable compound(s) between two substrates is polymerized, at least the substrate to be irradiated must be transparent to an active energy beam. After a particular portion of the polymerizable compound(s) is polymerized using a mask during irradiation, an electric field, a magnetic field, temperature, or another condition may be altered to change the orientation of an unpolymerized portion, which is then polymerized by the irradiation of an active energy beam. In the case of UV exposure, a liquid crystal composition containing a polymerizable compound is preferably exposed to UV light while an alternating electric field is applied to the liquid crystal composition. The alternating electric field preferably has a frequency in the range of 10 to 10,000 Hz, more preferably 60 to 10,000 Hz. The voltage depends on the desired pretilt angle of a liquid crystal display element. In other words, the pretilt angle of a liquid crystal display element can be controlled through the voltage to be applied. The pretilt angle of an MVA-mode liquid crystal display element is preferably in the range of 80 to 89.9 degrees in terms of orientation stability and contrast.

The irradiation temperature is preferably in such a range that a liquid crystal composition according to the present invention can retain its liquid crystal state. The polymerization temperature is preferably close to room temperature, typically in the range of 15° C. to 35° C. Examples of lamps for generating UV light include metal halide lamps, high-pressure mercury lamps, and ultrahigh-pressure mercury lamps. The wavelength of UV light is preferably outside the absorption wavelength range of a liquid crystal composition. In some cases, UV light is preferably filtered. The UV light intensity is preferably in the range of 0.1 mW/cm² to 100 W/cm², more preferably 2 mW/cm² to 80 W/cm². The UV light energy can be appropriately determined and is preferably in the range of 10 mJ/cm² to 500 J/cm², more preferably 100 mJ/cm² to 200 J/cm². During UV irradiation, the UV light intensity may be changed. The UV irradiation time depends on the UV light intensity and is preferably in the range of 10 to 3600 seconds, more preferably 10 to 600 seconds.

EXAMPLES

Although the present invention will be further described in the following examples, the present invention is not limited to these examples. The term "%" with respect to compositions in the following examples and comparative examples refers to "% by mass".

The following characteristics were measured.

$T_{ni}$: nematic phase-isotropic liquid phase transition temperature (° C.)

Δn: anisotropy of reflective index at 25° C.

Δε: anisotropy of dielectric constant at 25° C.

η: viscosity (mPa·s) at 20° C.

Method for Measuring Response Speed

A voltage of 5 V was applied to a vertical alignment liquid crystal display element produced by the polymerization of polymerizable compound(s) in a liquid crystal composition containing a polymerizable compound. The fall time (ms) after the voltage was decreased to 0 V was considered to be the response time.

Method for Measuring Amount of Residual Monomer After UV Curing

After a liquid crystal composition was injected into a liquid crystal cell, a polymerizable compound was polymerized by UV irradiation. The liquid crystal cell was then disassembled, and an acetonitrile solution of eluate containing a liquid crystal material, a polymer, and a residual polymerizable compound was obtained. The peak area of each component was measured by high-performance liquid chromatography (column: non-polar reversed-phase column, developing solvent: acetonitrile or acetonitrile/water, detector: UV detector). The amount of residual polymerizable compound was determined from the ratio of the peak area of the liquid crystal material, which served as a reference, to the peak area of the residual polymerizable compound. The amount of residual monomer was determined from the amount of residual polymerizable compound and the amount of initial polymerizable compound. The detection limit for the residual polymerizable compound was 500 ppm.

Method for Evaluating Burn-In

A voltage was applied to a liquid crystal display element after polymerization so as to display a black and white checkered pattern. While a halftone was displayed, temporal variations in luminance were visually checked.

Example 1

A liquid crystal composition LC-1 containing a compound having the general formula (II) and a compound having the general formula (III) was prepared. 0.3% polymerizable compound having the formula (I-1-1) was added to 99.7% LC-1 to prepare a liquid crystal composition CLC-1 containing a polymerizable compound. The physical properties of the liquid crystal composition CLC-1 are described below.

LC-1

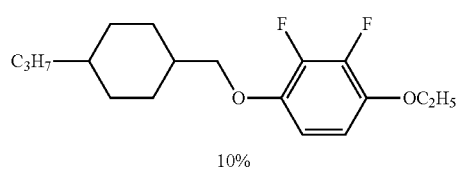

Formula (I-1-1)

10%

-continued

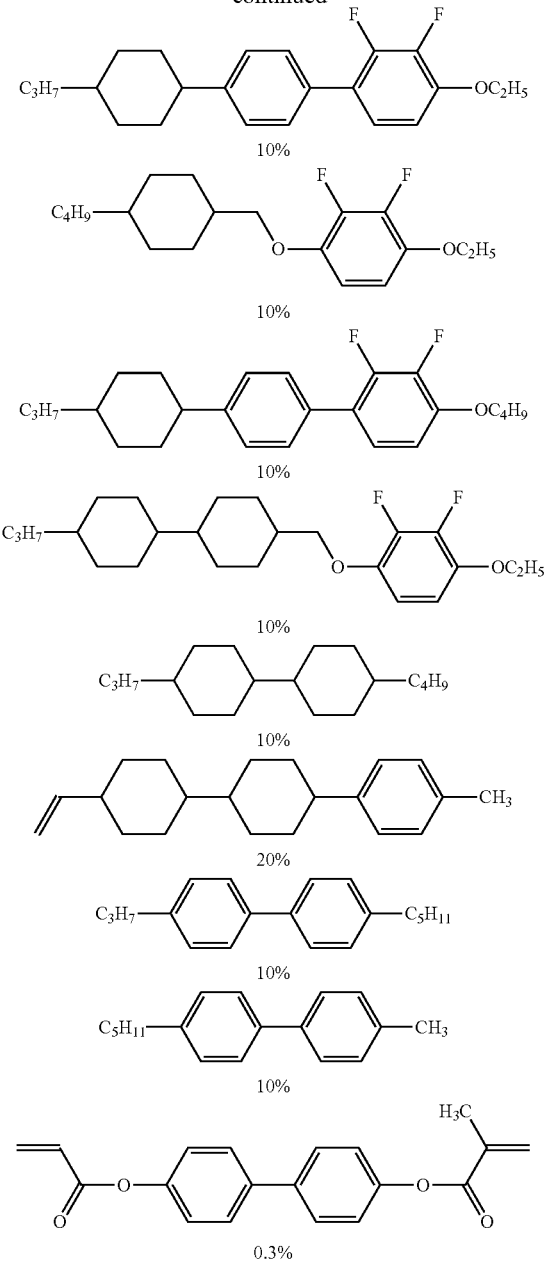

The liquid crystal composition CLC-1 had $T_{ni}$: 74.1° C., $\Delta n$: 0.101, and $\Delta\epsilon$: −3.0.

CLC-1 was injected into an ITO-coated cell by vacuum injection. The ITO-coated cell had a cell gap of 3.5 μm and had been coated with a polyimide alignment film that could induce homeotropic alignment. The pretilt angle of the cell was measured (a crystal rotation method). While 1.8-V rectangular waves were applied at a frequency of 1 kHz, the liquid crystal cell was irradiated with UV light from a high-pressure mercury lamp through a UV filter that could eliminate light having a wavelength of 320 nm or less. The irradiation was performed at an intensity of 15 mW/cm² on the cell surface for 600 seconds, yielding a vertical alignment liquid crystal display element in which the polymerizable compound in the liquid crystal composition was polymerized. The liquid crystal display element had a response time of 5.3 ms.

A residual polymerizable compound having the formula (I-1-1) in the liquid crystal display element was not detected by liquid chromatography. This proved that the amount of residual polymerizable compound having the formula (I-1-1) after polymerization was below the detection limit.

Comparative Example 1

0.3% polymerizable compound having the formula (A) was added to 99.7% liquid crystal composition LC-1 to prepare a liquid crystal composition CLC-A containing a polymerizable compound. This compound is the same as the polymerizable compound in Example 1 except that the polymerizable groups are acrylate groups.

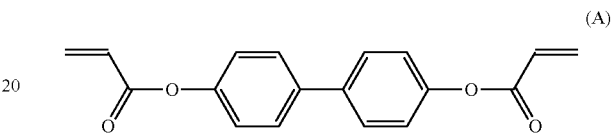

(A)

The physical properties of the liquid crystal composition CLC-A containing a polymerizable compound are described below.

The liquid crystal composition CLC-A had $T_{ni}$: 74.2° C., $\Delta n$: 0.101, and $\Delta\epsilon$: −3.0. A vertical alignment liquid crystal display element was fabricated in the same manner as Example 1 except for using CLC-A. The liquid crystal display element had a response time of 5.3 ms, which was the same as Example 1.

The amount of residual polymerizable compound having the formula (A) in the liquid crystal display element was 1500 ppm as measured by liquid chromatography. This proved that the polymerizable compound having the formula (A) was incompletely polymerized.

Comparative Example 2

0.3% polymerizable compound having the formula (I-1-1) was added to 99.7% liquid crystal composition LC-B to prepare a liquid crystal composition CLC-B containing a polymerizable compound. The physical properties of the liquid crystal composition CLC-B are described below.

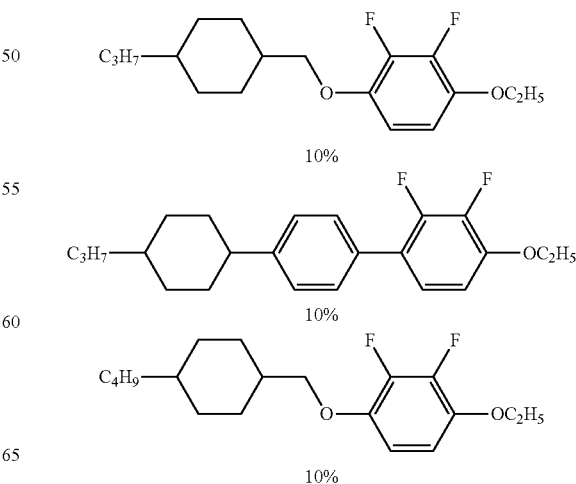

-continued

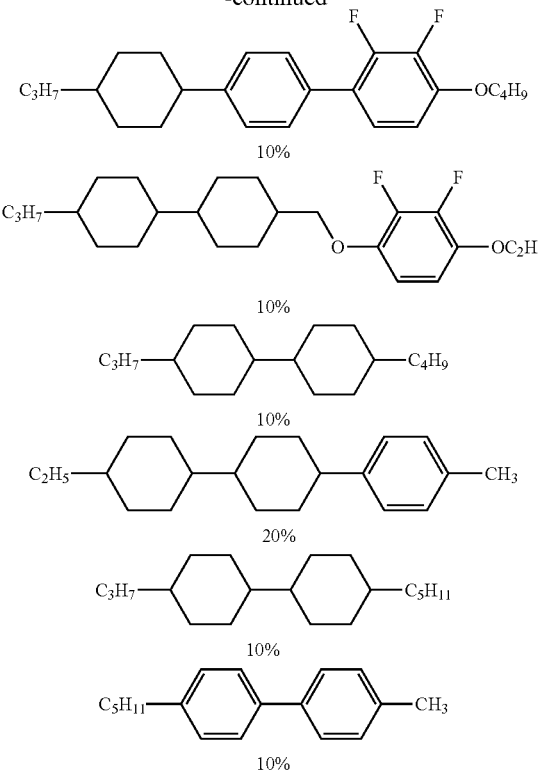

The liquid crystal composition CLC-B had $T_{ni}$: 74.6° C., Δn: 0.101, and Δε: −3.1. A vertical alignment liquid crystal display element was fabricated in the same manner as Example 1 except for using CLC-B. The liquid crystal display element had a response time of 6.4 ms, which is approximately 20% longer than the response time in Example 1.

The amount of residual polymerizable compound having the formula (I-1-1) in the liquid crystal display element was below the detection limit as measured by liquid chromatography.

A low-temperature storage test was performed in the liquid crystal display elements according to Example 1, Comparative Example 1, and Comparative Example 2. The liquid crystal display element according to Example 1 retained a nematic state at a temperature of −30° C. or −20° C. for two weeks. In contrast, the liquid crystal display elements according to Comparative Examples 1 and 2 retained a nematic state only for one week and caused precipitation on the second week. This proved that the liquid crystal composition containing a polymerizable compound according to Example 1 can retain the nematic state at a wide temperature range and is very useful.

TABLE

|  | Low-temperature storage test | |
|---|---|---|
|  | −30° C. | −20° C. |
| Example 1 | Retain nematic for 336 h | |
| Comparative example 1 | Retain nematic for 168 h | |
| Comparative example 2 | Retain nematic for 168 h | |

Example 2

A liquid crystal composition LC-2 containing a compound having the general formula (II) and a compound having the general formula (III) was prepared. 0.3% polymerizable compound having the formula (I-6-1) was added to 99.7% LC-2 to prepare a liquid crystal composition CLC-2 containing a polymerizable compound.

LC-2

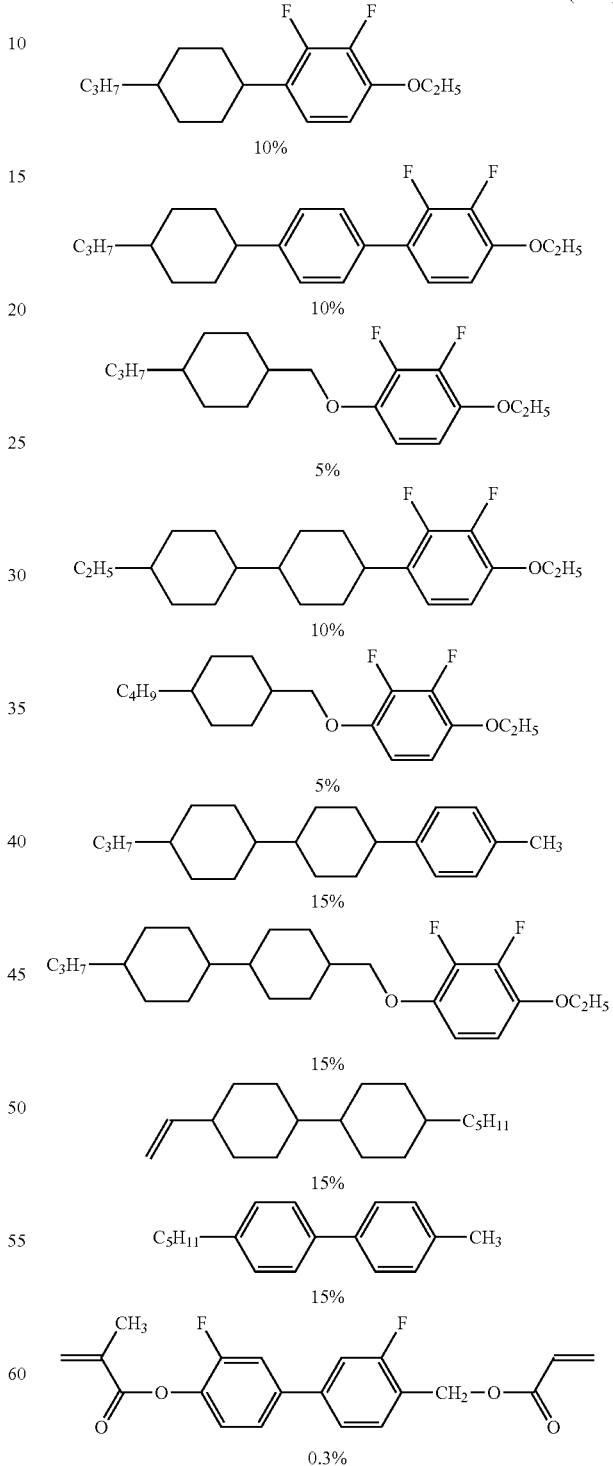

The liquid crystal composition CLC-2 had $T_{ni}$: 77.0° C., Δn: 0.103, and Δε: −3.2.

A vertical alignment liquid crystal display element was fabricated in the same manner as Example 1 except for using CLC-2. The liquid crystal display element had a response time of 4.7 ms.

A residual polymerizable compound having the formula (I-6-1) in the liquid crystal display element was not detected by liquid chromatography. This proved that the amount of residual polymerizable compound having the formula (I-6-1) after polymerization was below the detection limit.

Example 3

A liquid crystal composition LC-3 containing a compound having the general formula (II) and a compound having the general formula (III) was prepared. 0.3% polymerizable compound having the formula (I-13-1) was added to 99.7% LC-3 to prepare a liquid crystal composition CLC-3 containing a polymerizable compound.

LC-3

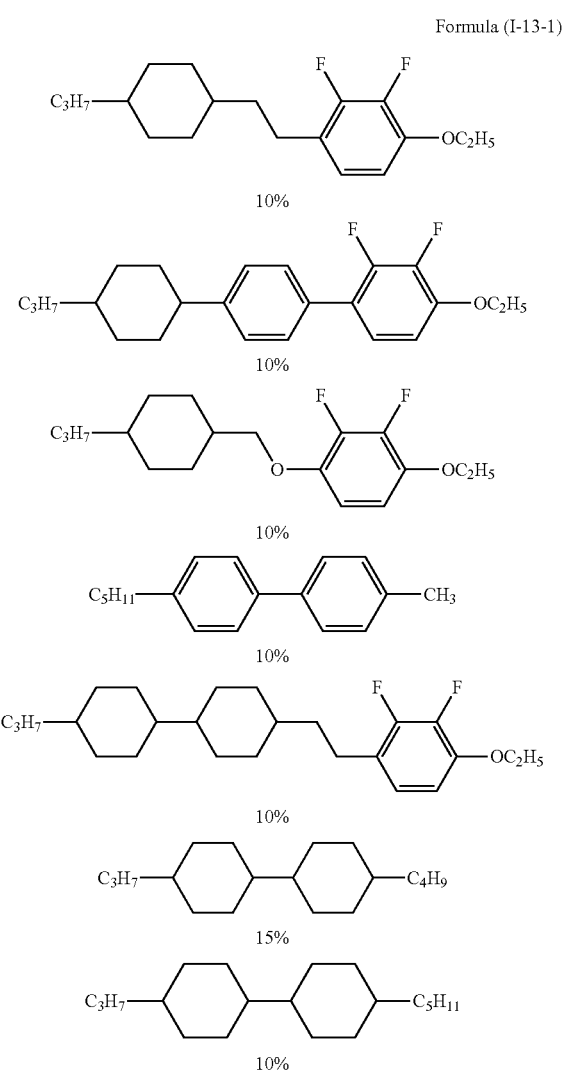

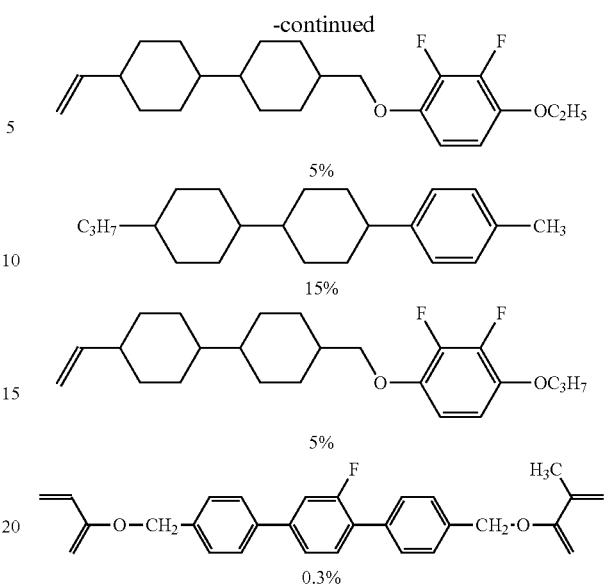

The liquid crystal composition CLC-3 had $T_{ni}$: 76.4° C., $\Delta n$: 0.090, and $\Delta\epsilon$: −2.9.

A vertical alignment liquid crystal display element was fabricated in the same manner as Example 1 except for using CLC-3. The liquid crystal display element had a response time of 5.0 ms.

A residual polymerizable compound having the formula (I-13-1) in the liquid crystal display element was not detected by liquid chromatography. This proved that the amount of residual polymerizable compound having the formula (I-13-1) after polymerization was below the detection limit.

Example 4

0.3% polymerizable compound having the formula (I-4-1) was added to 99.7% liquid crystal composition LC-1 to prepare a liquid crystal composition CLC-4 containing a polymerizable compound.

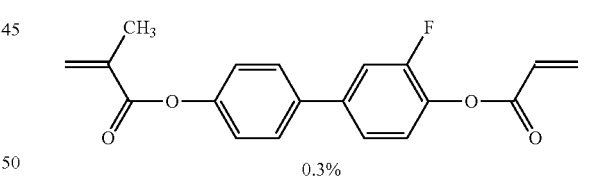

A vertical alignment liquid crystal display element was fabricated in the same manner as Example 1 except for using CLC-4. The liquid crystal display element had a response time of 5.1 ms.

A residual polymerizable compound having the formula (I-4-1) in the liquid crystal display element was not detected by liquid chromatography. This proved that the amount of residual polymerizable compound having the formula (I-4-1) after polymerization was below the detection limit.

Example 5

0.3% polymerizable compound having the formula (I-21-1) was added to 99.7% liquid crystal composition LC-1 to prepare a liquid crystal composition CLC-5 containing a polymerizable compound.

Formula (I-21-1)

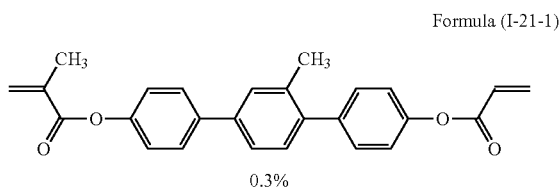 [SMILES: C=CC(=O)Oc1ccc(-c2ccc(-c3ccc(OC(=O)C(=C)C)cc3)cc2C)cc1]

0.3%

A vertical alignment liquid crystal display element was fabricated in the same manner as Example 1 except for using CLC-5. The liquid crystal display element had a response time of 5.2 ms.

A residual polymerizable compound having the formula (I-21-1) in the liquid crystal display element was not detected by liquid chromatography. This proved that the amount of residual polymerizable compound having the formula (I-21-1) after polymerization was below the detection limit.

Example 6 and Comparative Example 3

A voltage was applied to each of the liquid crystal display elements according to Examples 1 to 5 and Comparative Examples 1 and 2 after polymerization. The liquid crystal display elements were visually checked for burn-in as a function of time. In Table 1, circles indicate that no change was observed, and crosses indicate that burn-in was observed. A larger number of crosses indicate a higher degree of burn-in.

TABLE 1

|  | After 10 h | After 50 h | After 100 h | After 500 h |
|---|---|---|---|---|
| Example 1 | ○ | ○ | ○ | ○ |
| Example 2 |  |  |  |  |
| Example 3 |  |  |  |  |
| Example 4 |  |  |  |  |
| Example 5 |  |  |  |  |
| Comparative example 1 |  | X | XX | XXX |
| Comparative example 2 |  | ○ | ○ | ○ |

The liquid crystal display element according to Comparative Example 1 had burn-in at a display time of 48 hours and display defects almost over the entire surface at a display time of 168 hours. In contrast, the liquid crystal display elements according to Examples 1 to 5 maintained satisfactory display even after 500 hours. The liquid crystal display element according to Comparative Example 2 had a long response time. Although the polymerizable composition in the liquid crystal display element according to Comparative Example 2 had very poor low-temperature stability, no burn-in was observed.

These results show that non-polymerizable liquid crystal compounds in a liquid crystal composition according to the present invention are highly resistant to UV light and heat, liquid crystal display elements after complete polymerization of polymerizable materials have high reliability, and the resulting polymers have sufficient rigidity without losing liquid crystal orientation ability.

What is claimed is:

1. A liquid crystal composition containing a polymerizable compound, comprising a first component and a second component, wherein
the first component includes one or two or more compounds selected from the group consisting of polymerizable compounds having the general formula (I), and

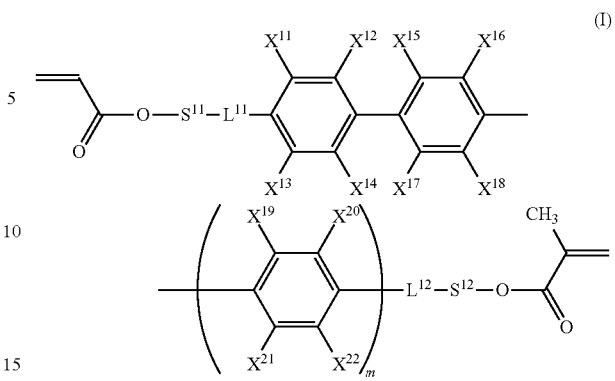

(wherein $S^{11}$ and $S^{12}$ independently denote an alkylene group having 1 to 12 carbon atoms or a single bond, and one —$CH_2$— or nonadjacent two or more —$CH_2$— in the alkylene group may be substituted by —O—, —COO—, —OCO—, or —OCOO—, $L^{11}$ and $L^{12}$ independently denote a single bond, —O—, —CO—, —COO—, —OCO—, or —C≡C—, m denotes 0 or 1, and $X^{11}$ to $X^{22}$ independently denote an alkyl group having 1 to 3 carbon atoms, a trifluoromethyl group, a trifluoromethoxy group, a fluorine atom, a chlorine atom, or a hydrogen atom)

the second component includes one or two or more non-polymerizable liquid crystal compounds having an alkenyl group.

2. The liquid crystal composition containing a polymerizable compound according to claim 1, wherein the second component includes one or two or more compounds having the general formula (II)

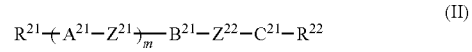

(wherein $R^{21}$ and $R^{22}$ independently denote an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, at least one of $R^{21}$ and $R^{22}$ denotes an alkenyl group having 2 to 10 carbon atoms or an alkenyloxy group having 2 to 10 carbon atoms, one —$CH_2$— or nonadjacent two or more —$CH_2$— in $R^{21}$ and $R^{22}$ may be substituted by —O— or —S—, and one or two or more hydrogen atoms in $R^{21}$ and $R^{22}$ may be substituted by a fluorine atom or a chlorine atom, $Z^{21}$ and $Z^{22}$ independently denote a single bond, —$CH_2CH_2$—, —$(CH_2)_4$—, —$OCH_2$—, —$CH_2O$—, —$OCF_2$—, —$CF_2O$—, —CH=CH—, or —C≡C—, and $A^{21}$, $B^{21}$, and $C^{21}$ independently denote a 1,4-phenylene group, a 1,4-cyclohexenylene group, a 1,4-bicyclo(2.2.2)octylene group, a naphthalene-2,6-diyl group, a decahydronaphthalene-2,6-diyl group, a 1,2,3,4-tetrahydronaphthalene-2,6-diyl group, or a 1,4-cyclohexylene group, $A^{21}$, $B^{21}$, and $C^{21}$ may be independently unsubstituted, or a hydrogen atom in $A^2$, $B^2$, and $C^{21}$ may be substituted by a fluorine atom, a chlorine atom, a cyano group, an alkyl group having 1 to 8 carbon atoms, a halogenated alkyl group having 1 to 8 carbon atoms, a halogenated alkoxy group having 1 to 8 carbon atoms, an alkoxy group having 1 to 8 carbon atoms, or a nitro group, and m denotes 0 or 1).

3. The liquid crystal composition containing a polymerizable compound according to claim 1, wherein at least one of $X^{11}$ to $X^{22}$ in the general formula (I) denotes a fluorine atom or a methyl group.

4. The liquid crystal composition containing a polymerizable compound according to claim 2, wherein the second component includes at least one compound selected from compounds having the general formulae (II-1) to (II-4)

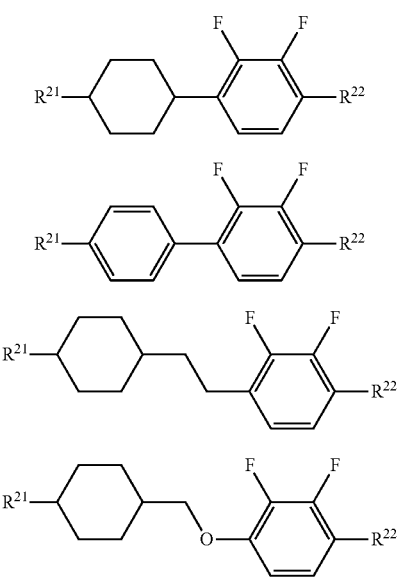

(wherein $R^{21}$ and $R^{22}$ independently denote an alkyl group having 1 to 10 carbon atoms, an alkoxy group having 1 to 10 carbon atoms, an alkenyl group having 2 to 10 carbon atoms, an alkenyloxy group having 2 to 10 carbon atoms, a fluorine atom, a trifluoromethyl group, a trifluoromethoxy group, or a chlorine atom, at least one of $R^{21}$ and $R^{22}$ denotes an alkenyl group having 2 to 10 carbon atoms or an alkenyloxy group having 2 to 10 carbon atoms, one —$CH_2$— or nonadjacent two or more —$CH_2$— in $R^{21}$ and $R^{22}$ may be substituted by —O— or —S—, and one or two or more hydrogen atoms in $R^{21}$ and $R^{22}$ may be substituted by a fluorine atom or a chlorine atom).

5. The liquid crystal composition containing a polymerizable compound according to claim 2, wherein the second component includes at least one compound selected from compounds having the general formulae (II-5) to (II-10)

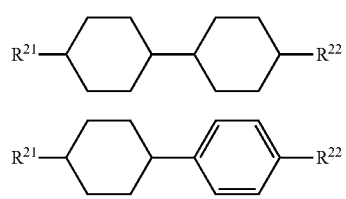

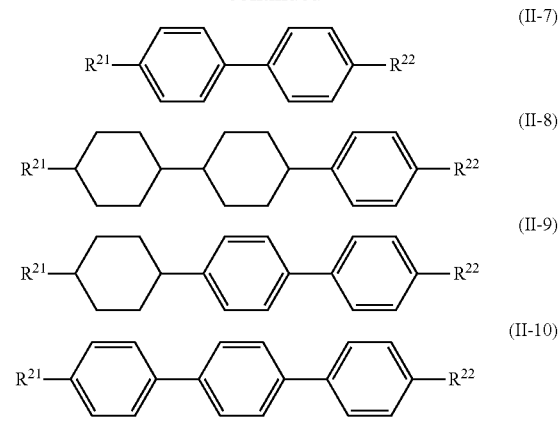

(wherein $R^{21}$ and $R^{22}$ independently denote an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, at least one of $R^{21}$ and $R^{22}$ denotes an alkenyl group having 2 to 10 carbon atoms or an alkenyloxy group having 2 to 10 carbon atoms, one —$CH_2$— or nonadjacent two or more —$CH_2$— in $R^{21}$ and $R^{22}$ may be substituted by —O— or —S—, and one or two or more hydrogen atoms in $R^{21}$ and $R^{22}$ may be substituted by a fluorine atom or a chlorine atom).

6. The liquid crystal composition containing a polymerizable compound according to claim 2, further comprising a third component and a fourth component, wherein
the third component includes one or two or more compounds selected from the group consisting of compounds having the general formulae (III-1) to (III-4), and

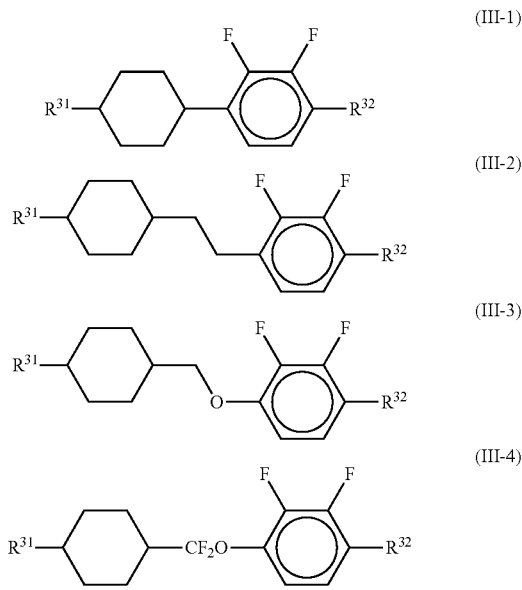

(wherein $R^{31}$ and $R^{32}$ independently denote an alkyl group having 1 to 10 carbon atoms or an alkoxy group having 1 to 10 carbon atoms, one —$CH_2$— or nonadjacent two or more —$CH_2$— in $R^{31}$ and $R^{32}$ may be substituted by —O— or —S—, and one or two or more hydrogen atoms in $R^{31}$ and $R^{32}$ may be substituted by a fluorine atom or a chlorine atom)

the fourth component includes one or two or more compounds selected from compounds having the general formulae (III-5) to (III-8)

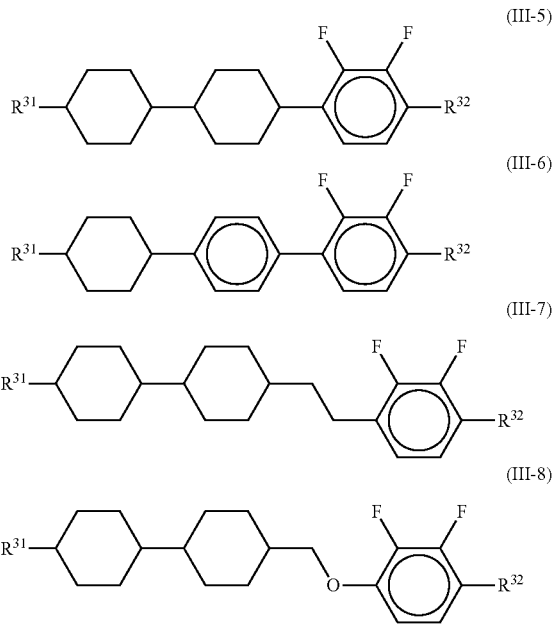

(wherein $R^{31}$ and $R^{32}$ independently denote an alkyl group having 1 to 10 carbon atoms or an alkoxy group having 1 to 10 carbon atoms, one —CH$_2$— or nonadjacent two or more —CH$_2$— in $R^{31}$ and $R^{32}$ may be substituted by —O— or —S—, and one or two or more hydrogen atoms in $R^{31}$ and $R^{32}$ may be substituted by a fluorine atom or a chlorine atom).

7. The liquid crystal composition containing a polymerizable compound according to claim 1, wherein the one or two or more compounds having the general formula (I) constitute 0.01% to 2.0% by mass.

8. The liquid crystal composition containing a polymerizable compound according to claim 4, wherein the at least one compound having the general formulae (II-1) to (II-4) constitutes 5% to 40% by mass.

9. The liquid crystal composition containing a polymerizable compound according to claim 1, wherein the anisotropy of dielectric constant Δε at 25° C. is in the range of −2.0 to −6.0, the anisotropy of reflective index Δn at 25° C. is in the range of 0.08 to 0.13, and the nematic phase-isotropic liquid phase transition temperature ($T_{ni}$) is in the range of 60° C. to 120° C.

10. The liquid crystal composition containing a polymerizable compound according to claim 1, wherein the liquid crystal composition is used in a liquid crystal display element that contains liquid crystals between a pair of substrates, the substrate including a transparent electrode and a polarizer, and the polymerizable compound(s) in the liquid crystal composition is polymerized to impart liquid crystal orientation ability to the liquid crystal display element.

11. A liquid crystal display element manufactured using a liquid crystal composition containing a polymerizable compound according to claim 1, wherein the polymerizable compound(s) in the liquid crystal composition is polymerized to impart liquid crystal orientation ability to the liquid crystal display element.

12. An active-matrix liquid crystal display element, manufactured using a liquid crystal composition containing a polymerizable compound according to claim 1.

13. A VA-mode, PSVA-mode, IPS-mode, or ECB-mode liquid crystal display element, manufactured using a liquid crystal composition containing a polymerizable compound according to claim 1.

* * * * *